Jan. 30, 1968  H. G. LUTZ ET AL  3,365,903

APPARATUS FOR THE PREPARATION OF SOFT ICE OR MILK ICE

Filed Nov. 30, 1965  3 Sheets-Sheet 1

Inventors:
HANS GEORG LUTZ
AND WALDEMAR MENZEL
BY Robert H Jacob
AGT.

Jan. 30, 1968  H. G. LUTZ ET AL  3,365,903
APPARATUS FOR THE PREPARATION OF SOFT ICE OR MILK ICE
Filed Nov. 30, 1965  3 Sheets-Sheet 3

Inventors:
HANS GEORG LUTZ
AND WALDEMAR MENZEL
BY Robert H. Jacob
AGT.

United States Patent Office 3,365,903
Patented Jan. 30, 1968

3,365,903
APPARATUS FOR THE PREPARATION OF SOFT ICE OR MILK ICE
Hans Georg Lutz, Kulmbach, and Waldemar Menzel, Burgheig, near Kulmbach, Germany; said Menzel assignor to Ireks G.m.b.H., Kulmbach, Bavaria, Germany, a firm
Continuation-in-part of application Ser. No. 167,323, Jan. 19, 1962. This application Nov. 30, 1965, Ser. No. 534,554
(Filed under Rule 47(a) and 35 U.S.C. 116)
8 Claims. (Cl. 62—177)

The present invention relates to the preparation of frozen food products, such as milk ices, and is particularly concerned with apparatus for making milk ice, also referred to as soft ice.

The subject matter and inventive concept was previously disclosed in applicants' earlier application Ser. No. 167,323 of Jan. 19, 1962, of which the present application is a continuation-in-part which describes certain features in greater detail and introduces an alternate embodiment incorporating the basic principles of the present invention.

In known apparatuses for the preparation of food ices that are frozen in foamed condition and dispensed in small quantities, referred to as milk ice, also called soft ice, the initial mixture which is usually made of milk, sugar, flavoring and binding agents, is poured into a storage container, and from this container the mix flows through a feed tube which draws in air, and together with such air into a freezing kettle containing a stirring mechanism from which the milk ice is removed in small quantities for immediate consumption. In the freezing kettle of the milk ice freezers, also know as soft ice freezers, there is thus a ready supply of the frozen milk ice for distribution in small quantities. During the stirring this frozen product is fluffed up by the air supplied to the mix, referred to hereafter as injection air, which renders the product more palatable and tasty. However, the milk ice freezers known heretofore permit only a limited and irregular admixture of air. It would, of course, be possible to increase the initial injection air by increasing the stirring or beating movement of the stirring mechanism in the freezing kettle or by whipping up a foam of the milk ice by means of a special stirring mechanism, but this would involve the shortcoming that the initial mixture which usually contains milk fats would separate out butter, and therefore the even consistency would be destroyed. Such air increase would only be possible with such types of milk ices that have essentially no fat content and even then only to a limited extent, because otherwise the mix would be battered within a relatively short time. Moreover, in the freezers of the prior art the injected air of the ice is known to have the tendency to decrease during operation and particularly during the dispensing.

It is an object of the present invention to eliminate the foregoing shortcomings. The invention provides a food ice freezer for dispensing ices in portions, the freezing container of which serves simultaneously as a storage space for the frozen ice product that is ready to be dispensed, where the supply container for the initial mix is constructed as an excess pressure container, and where both containers have air spaces which are under excess pressure, while the connection to the source of air under pressure is arranged in a manner that the compressed air first reaches the freezing container and thence arrives in the air espace of the supply container.

Where reference is made hereinafter to air, it is understood that another suitable gas, such as carbonic acid, may be used in lieu of air.

The stirring mechanism of the ice freezer in accordance with the invention may also be operated at a lower number of rotations than the stirring mechanism of non-soft ice machines. While those machines operate, for example, at 200 r.p.m., the freezers in accordance with the invention may under certain conditions be operated at only 50 r.p.m. The ice mix is therefore protected, but nevertheless a high air content is imparted to it. The added air must, of course, be introduced at a pressure which corresponds to the excess pressure in the air space of the freezing kettle, and the soft ice freezers for dispensing small quantities known heretofore were not equipped for this.

The pressure in the air space of the freezing kettle, and therefore also the excess pressure of the air to be added to the initial mix, must suitably be held within certain limits. If this excess pressure is too high, for example between 2 to 4 atm., then relatively large continuous chains of air bubbles may be formed in the ice foam during the preparation of the milk ice which interfere with the even consistency of the product that is required especially for this type of food ice product. The excess pressure in the air space is suitably chosen between 0.1 to 2 atm., preferably between 1.3 and 1.6 atm., depending on the desired amount of injected air.

The milk ice freezers of the type on which the invention is predicated are therefore readily distinguished from known frozen product machines which produce larger quantities of ices in a continuous process and expel them as a continuous column of ice, where air under pressure is used for the expulsion or feeding. A known machine of this type has a freezing space in the form of a relatively narrow and elongated inclined tube which is fed from below with mix under pressure which is to be frozen. The pressure is produced by a piston pump which is provided below the end of the freezing tube and drives the mix being frozen through the tube, which it completely fills, toward the upper end of the tube where on outlet is provided. The freezing tube or kettle thus contains no ice supply at rest and no air space above the supply, thereby differing from soft ice freezers for the retail dispensing of ice portions of the type to which the present invention relates. The air pressure produced by the pump of such known machines serves exclusively for feeding the mass through the freezing tube or kettle, which does not contain a feed worm or the like but only a stirring blade mechanism which merely serves for working the mass. The construction of such ice freezers and the maintenance thereof is considerably more cumbersome than with the soft ice freezer in accordance with the invention.

Furthermore, the invention makes it possible to maintain the level of the ice in the frezing container constant by simple means or to adjust it to a desired height.

A further advantage of the invention resides in that all spaces of the ice freezer containing the ice mix remain closed against the outer air in a manner that neither impurities nor germ containing air can reach the ice mix.

Other advantages of the invention will become apparent if reference is had to the accompanying drawings which illustrate in schematic representation embodiments of the ice freezer in accordance with the invention and where parts that are non-essential for the invention have been omitted.

Figure 1:
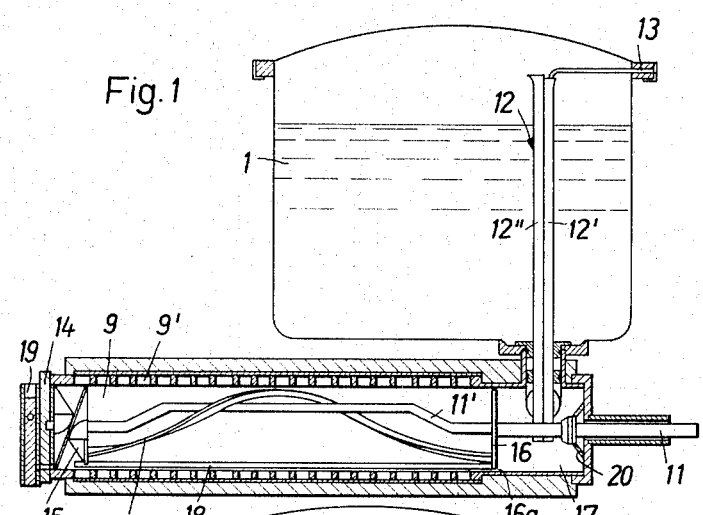
FIGS. 1 and 2 illustrate partly in section a side view and a front view of one embodiment where the connection for the compressed air is combined with a particular inlet tube leading from the supply container into the freezing container.
Figure 2:
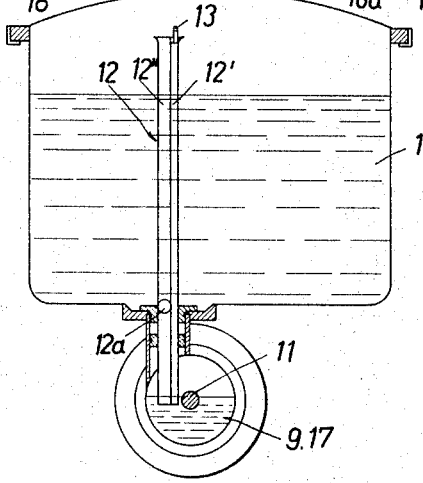

The apparatus in accordance with FIGS. 1 and 2 comprises the supply container 1 for the ice mix having a feed means such as a supply tube 12 and a freezing container or kettle 9 including the stirring mechanism. The stirring shaft 11 has connected thereto the stirring coils 10 as well as a stripper or spatula 18, which rotate in the freezing kettle 9, and a feed worm 15. The extension 11' of the shaft 11 which rotates in the kettle 9 is offset from the center, so that the frozen mass will not accumulate in the area of the axis of the kettle. The kettle 9 is preferably arranged as shown, with its axis disposed horizontally, but it may also be inclined. The forward end is closed by a cover 14 which carries the dispensing device 19 for the portions of frozen product. The kettle walls are in the form of a double walled mantle with helical cooling channels 9' through which a cooling agent flows.

As illustrated, the supply tube or channel member 12 comprises two channels 12' and 12" which are disposed parallel alongside one another. The compressed air connection 13 is linked to one of these channels 12'. The second channel 12" is in communication at its upper open end with an air space defined in the supply container 1 above the mix and further through a lateral opening 12a with the container portion in which the liquid mix is stored. The tube 12 is immersed with its lower end in the freezing kettle or container 9, where both channels 12' and 12" are open, below the normal level of the ice mix contained therein. The channel 12' serves for supplying air under pressure to the air space of the freezing kettle 9. A balancing of the pressure between the freezing kettle and the air space of the supply container 1 takes place, on the one hand, through the other channel 12", so that also the latter is under excess pressure, while on the other hand the ice mix on its way to the freezing kettle 9 is intimately mixed with the air under pressure in the said channel 12". At the inlet end of the kettle 9 adjacent the stirring mechanism 10 a spaced receiving chamber 17 is defined by a wall 16 so that an ice mix level develops which alternately closes and opens the lower inlet of the mixing tube but which does not permit clogging of this inlet by frozen ice mix. The supply and mixing tube or valve extends with its lower opening below the level of the milk ice which normally is present in the chamber 17. The wall 16 is suitably defined by a disk connected with the stirring shaft 11 which essentially leaves only a narrow gap 16a proximate the wall of the freezing kettle 9. The ice mix enters through this gap 16a into the actual freezing space. The stirring shaft 11 extends from the forward end of the freezing compartment 9 through said compartment and through said disk 16, through the receiving chamber 17 and projects outwardly from the receiving chamber. A sealing sleeve 20 is provided around the shaft 11 at the end of chamber 17 to prevent the escape of air and liquid ice mix.

The initial mix contained in the ice freezer is not subjected to any mechanical load at all, so that no danger of butter separation exists at that point. The stirring mechanism 10 in the freezing kettle 9 serves only for stripping off the frozen product from the walls of the kettle and does not apply any adverse beating effect. Thus in accordance with the invention initial mixes having high fat contents may be processed into a milk ice of very loose consistency.

In the operation of the apparatus the ice mix enters from the supply container 1 into the receiving chamber 17 through the aperture 12a in channel 12" which is at the bottom of said channel while air enters through channel 12" from the top. Both the mix and the air flow out at the lower end of the tube 12. The supply container is filled with mix to a point below the upper end of supply tube 12. The top of the container 1 is closed and air under pressure is applied at 13, which may be derived from a compressed air cylinder or may be produced by a pump. The flow of air continues until the level of the mix in the freezing kettle 9 has risen to a point above the lower open end of tube 12 and the pressure in the freezing kettle 9 is substantially the same as the pressure above the mix in supply container 1. Any air displaced by the ice mix that enters through the tube 12 can escape only until the level in the kettle 9 and in chamber 17 has risen to cover the aperture at the lower end of the tube. As a result the further flow of ice mix is interrupted, because whatever air it would displace cannot escape.

If portions of finished ice food product are dispensed through the discharge opening at 14 the level in the receiving chamber 17 drops and since the aperture at the lower end of the tube 12 is again open, new ice mix with an added high content of air can flow from the supply container 1 by way of channel 12", and new compressed air can flow from kettle 9 to container 1 by way of channel 12' until the opening at the lower end of the tube 12 is again closed.

The diameter of the bore 12a may be proportioned in a manner to correspond to the velocity of the ice mix. The bore 12a should be such that the ice mix flows more slowly than the finished product, so that actually the lower opening of the tube 12 will be open for short periods of time so that in addition to ice mix also compressed air from the container 1 can follow.

As already mentioned, it is essential with food ice freezers to keep the spaces that contain the ice mix immaculately clean and to protect their contents against entrance of impurities to the greatest possible extent. The apparatus illustrated in FIGS. 1 and 2 already meets these requirements to a considerable extent in that the supply container which is in the form of an excess pressure container is permanently closed against the outer air, and no germ containing air can enter it from the outside.

Figure 3:
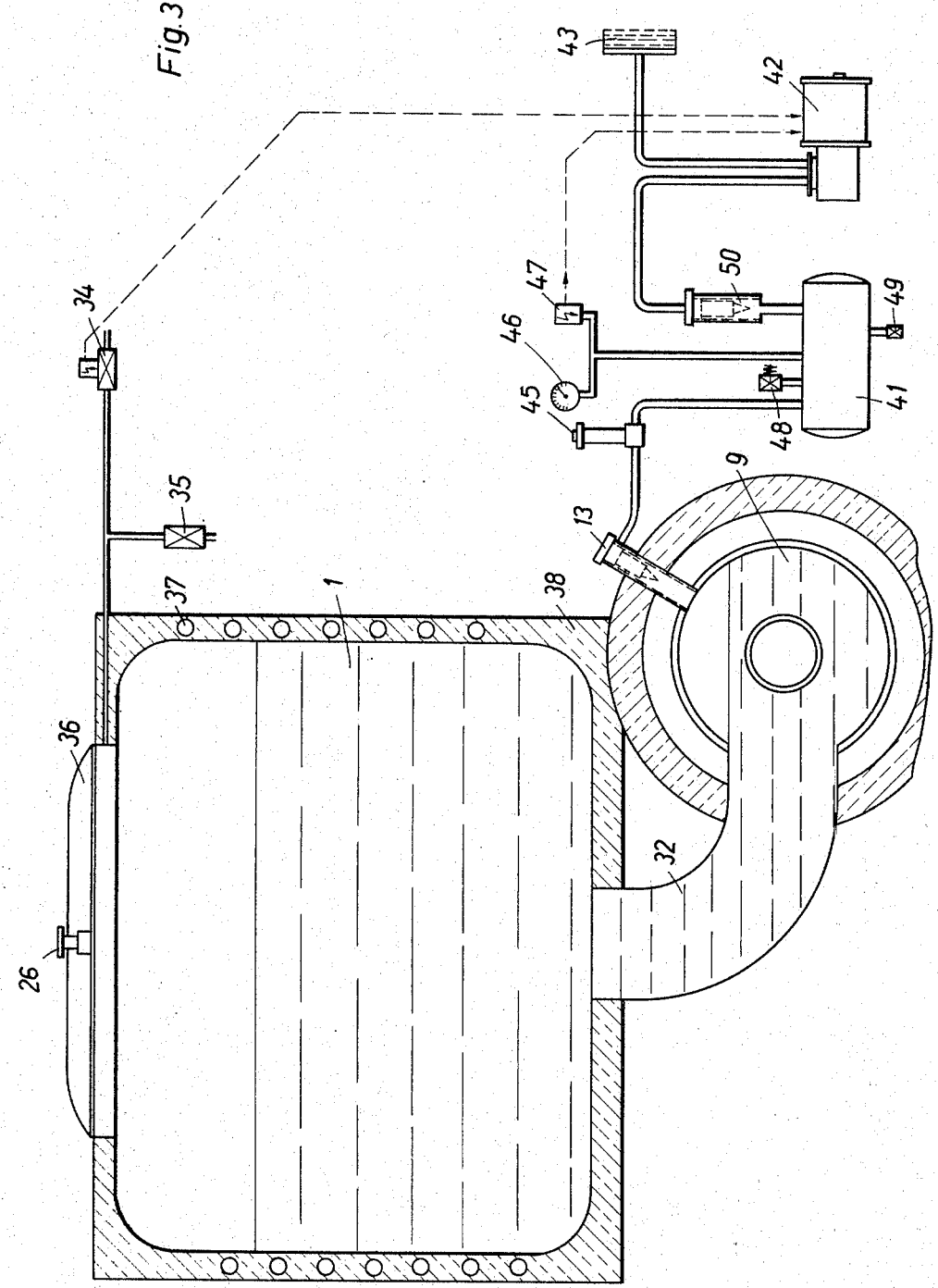
FIGS. 3 and 4 illustrate partly in cross-section and in longitudinal section a further embodiment where the connection for the compressed air is directly at the freezing container and the latter is in communication with the supply container by a simple connecting channel that transfers the pressure to the supply container and without a special supply tube.
Figure 4:
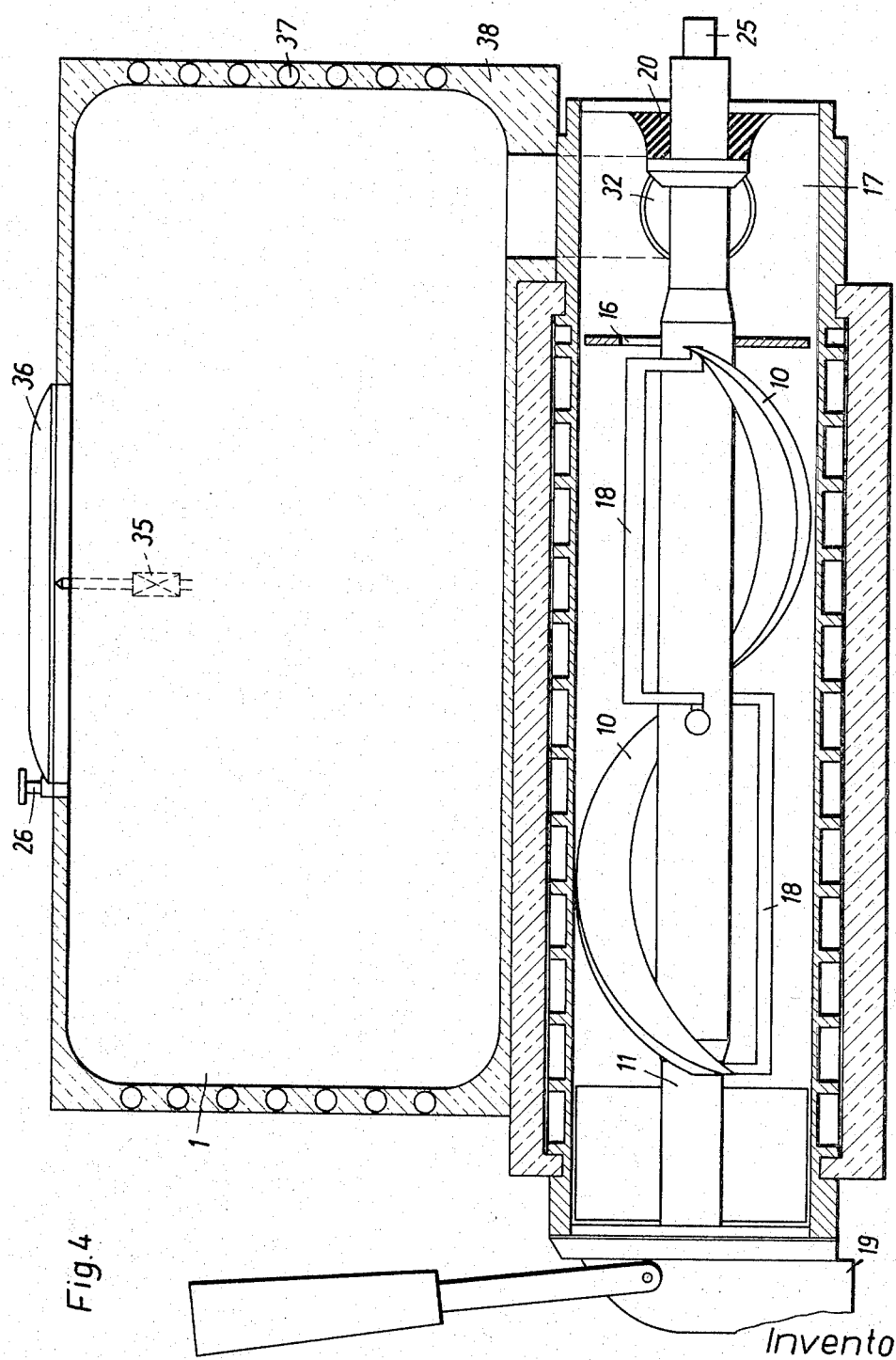

The embodiment illustrated in FIGS. 3 and 4 simplifies the apparatus in accordance with FIGS. 1 and 2 and also the cleaning in that in it the inflow or intake tube which is relatively difficult to clean has been eliminated. In the same manner as in FIGS. 1 and 2 the excess pressure is supplied from the bottom by way of the connecting channel from the freezing kettle to the supply container. Here the connecting channel is relatively wide and therefore easy to clean. The connection for the compressed air at the freezing kettle can also be utilized to blow air through the connecting channel for cleaning purposes.

The connection for the compressed air of the freezing kettle is suitably arranged at the upper part thereof in the region of its air space.

The connecting channel between the supply container and the freezing kettle is advantageously so arranged that it enters laterally in the area of the contents, and with the freezing space being largely filled the opening of the connecting channel at the freezing kettle is closed by the contents thereof.

The pressure which is effective in the supply container from the bottom upwardly can be utilized for a further protective measure against soiling of the contents in the ice freezer in that the source of compressed air is automatically activated as the cover of the supply container is removed, so that then an air current, opposing the entrance of dust or germ containing air, emerges through the opening for the cover.

The components provided for the supply of compressed air are shown in FIG. 3, drawn to a smaller scale.

The supply container 1 which receives the initial mixture is connected in accordance with the invention through a single connecting channel 32 with the freezing kettle 9. The container 1 is an excess pressure container with a suitably sealed cover 36 and a cooling coil 37 that is embedded in the insulation 38 which surrounds the container. The channel 32 which is in the form of an elbow tube leads into the freezing kettle 9 from one side.

The freezing kettle 9 which is likewise surrounded by insulation contains in its upper part the compressed air connection or channel 13 which is in the form of a one-way valve inserted in the wall of the container. For the filled condition of the freezing kettle the uppermost point of the connecting channel 32 is covered by the contents so that this air space into which leads the compressed air connection 13 is closed by the contents with respect to channel 32 and container 1. The compressed air is drawn in by compressor 42 by way of a germ filter 43 in extensively purified condition and is forced by way of a valve 50 into the compressed air tank 41 which is provided with a manometer 46, a compression swicth 47 which automatically cuts off the compressor 42 depending on the pressure reached in the kettle, a safety valve 48, and a discharge valve or cock 49. Furthermore, a tightly sealed stub 45 is provided at the compressed air conduit which is opened for blowing through the conduit or can be used for the insertion of a further measuring instrument, but which above all may contain a germ filter for the compressed air.

The freezing kettle 9 contains a shaft 11 which at 20 is brought out of the kettle and has the stub 25 for the connection of the drive means. The shaft is provided with a stripper 18 and a stirring helix 10. The freezing kettle contains also an antechamber 17 separated by a transverse wall 16 into which the connecting channel 32 leads from the container 1. The conventional dispensing means 19 for the finished ice product is provided at the head of the freezing kettle 9.

The cover 36 of the supply container 1 is relatively small so that, as it is opened, only a relatively small entrance area for the dust and other impurities is freed and the aforementioned air stream is enabled to more readily counteract the entrance of such impurities. A screw lock 26 or any other pressure closure holds down the cover 36. A pressure switch 34 automatically effects the starting of the source of compressed air, for example, of the compressor 42 when reduced pressure results proximate the aperture for the cover as the cover 36 is opened. In order to facilitate any intentional opening of the cover a discharge member 35 for the automatic decreasing of the pressure is provided. This outlet can also be in the form of a remote controlled electromagnetic valve.

The illustrated form of the curved connecting channel 32 and of its lateral entrance into the kettle 9 provides the advantage that without additional separating walls or so-called aprons in the upper part of the kettle 9 a closed air space is formed, at least when the stirring means are at rest. This air space advantageously should be about ⅓ to ⅔ of the volume of the freezing kettle. The uppermost point of the entrance of the channel 32 into the kettle 9 may be, for example, for cylindrical kettle shape approximately 9/10 of the radius below the crown of the kettle. Thus, it is approximately at the same height as the lower end of the inflow tube 12 in the embodiment in accordance with FIGS. 1 and 2.

The invention has been described with reference to the embodiments illustrated in the drawings, but it is not desired to be limited thereto inasmuch as the inventive concept may be applied to different structures without departing from the invention as disclosed and as set forth in the appended claims.

We claim:

1. Apparatus for making a frozen food product such as milk ice and for dispensing the product in portions, said apparatus comprising, in combination, a refrigerated freezing kettle having a discharge device at one end and an ice mix receiving chamber at its other end and serving simultaneously as storage container for the finished ice product and for enclosing a first air space maintained above atmospheric pressure, an ice mix supply container defining a second air space over the mix therein and maintained above atmospheric pressure, ice mix feed means including a tube extending between said supply container and said receiving chamber, a source of compressed air, a tubular channel connecting said source to said receiving chamber for supplying air under pressure thereto and thence through said tube to said second air space, a disc defining a wall extending transversely of said freezing kettle and into close proximity of the periphery thereof and defining a gap with the periphery and dividing said kettle into a receiving chamber and a freezing chamber, and stirring means being disposed in said freezing chamber and having a shaft extending through said wall and through said receiving chamber and projecting outwardly therefrom.

2. Apparatus for making a frozen food product such as milk ice and for dispensing the product in portions, said apparatus comprising, in combination, a refrigerated freezing kettle having a discharge device at one end and an ice mix receiving chamber at its other end and serving simultaneously as storage container for the finished ice product and for enclosing a first air space maintained above atmospheric pressure, and ice mix supply container defining a second air space over the mix therein and maintained above atmospheric pressure, ice mix feed means including a tube extending between said supply container and said receiving chamber, a source of compressed air, a tubular channel connecting said source to said receiving chamber for supplying air under pressure thereto and thence through said tube to said second air space, a disk extending transversely of said freezing kettle and into close proximity of the periphery thereof defining a gap with said periphery and dividing said kettle into a receiving chamber and a freezing chamber, and stirring means being disposed in said freezing chamber and having a shaft extending through said wall and through said receiving chamber and projecting outwardly therefrom, and said tube extending from said supply container to said receiving chamber and having an aperture at the lower end thereof disposed below the center of said receiving chamber.

3. Apparatus for making a frozen food product such as milk ice and for dispensing the product in portions, said apparatus comprising, in combination, a refrigerated freezing kettle having a discharge device at one end and an ice mix receiving chamber at its other end and serving simultaneously as storage container for the finished ice product and for enclosing a first air space maintained above atmospheric pressure, an ice mix supply container defining a second air space over the mix therein and maintained above atmospheric pressure, ice mix feed means including a tube extending between said supply container and said receiving chamber, a source of compressed air, a tubular channel connecting said source to said receiving chamber for supplying air under pressure thereto and thence through said tube to said second air space, said tube extending from said kettle to the lower end portion of said supply container, said receiving chamber having an aperture in communication with said tube generally below the level of the mix supplied thereto and adapted to be closed by the mix in said receiving chamber.

4. Apparatus for making a frozen food product such as milk ice and for dispensing the product in portions, said apparatus comprising, in combination, a refrigerated freezing kettle having a discharge device at one end and an ice mix receiving chamber at its other end and serving simultaneously as storage container for the finished ice product and for enclosing a first air space maintained above atmospheric pressure, an ice mix supply container defining a second air space over the mix therein and maintained above atmospheric pressure, ice mix feed means including a tube extending between said supply container and said receiving chamber, a source of compressed air, a tubular channel connecting said source to said receiving chamber for supplying air under pressure thereto and thence through said tube to said second air space, said tube extending from said kettle to the lower end portion of said supply container, and a cover provided on said supply container and means operatively responsive to removal of said cover to start the flow of air into said freezing kettle and upwardly to said second air space to establish an air stream out of said supply container and check the inflow of air containing impurities.

5. Apparatus in accordance with claim 4, where a control element such as a pressure switch is provided proximate said cover responsive to a decrease in air pressure when said cover is removed to render said source of air pressure operative.

6. Apparatus for making a frozen food product such as milk ice and for dispensing the product in portions, said apparatus comprising, in combination, a refrigerated freezing kettle having a discharge device at one end and an ice mix receiving chamber at its other end and serving simultaneously as storage container for the finished ice product and for enclosing a first air space maintained above atmospheric pressure, an ice mix supply container defining a second air space over the mix therein and maintained above atmospheric pressure, ice mix feed means including a tube extending between said supply container and said receiving chamber, a source of compressed air, a tubular channel connecting said source to said receiving chamber for supplying air under pressure thereto and thence through said tube to said second air space, said tube extending from said kettle to the lower end portion of said supply container, said receiving chamber having an aperture in communication with said tube generally below the level of the mix supplied thereto and adapted to be closed by the mix in said receiving chamber, said tube being elbow shaped and being connected at its lower end laterally of said receiving chamber in a manner that in filled condition of said receiving chamber with mix said first air chamber is defined above the level of the mix and by the upper wall of said chamber.

7. Apparatus for making a frozen food product such as milk ice and for dispensing the product in portions, said apparatus comprising, in combination, a refrigerated freezing kettle having a discharge device at one end and an ice mix receiving chamber at its other end and serving simultaneously as storage container for the finished ice product and for enclosing a first air space maintained above atmospheric pressure, an ice mix supply container defining a second air space over the mix therein and maintained above atmospheric pressure, ice mix feed means including a tube extending between said supply container and said receiving chamber, a source of compressed air, a tubular channel connecting said source to said receiving chamber for supplying air under pressure thereto and thence through said tube to said second air space, said tube extending from said kettle to the lower end portion of said supply container, said receiving chamber having an aperture in communication with said tube generally below the level of the mix supplied thereto and adapted to be closed by the mix in said receiving chamber, said tube being elbow shaped and being connected at its lower end laterally of the receiving chamber in a manner that in filled condition of said receiving chamber with mix said first air chamber is defined above the level of the mix and by the upper wall of said chamber, and said aperture having its uppermost point located along a line disposed approximately 9/10 of the radius of said chamber below the crown of said chamber.

8. Apparatus for making a frozen food product such as milk ice and for dispensing the product in portions, said apparatus comprising, in combination, a refrigerated freezing kettle having a discharge device at one end and an ice mix receiving chamber at its other end and serving simultaneously as storage container for the finished ice product and for enclosing a first air space maintained above atmospheric pressure, an ice mix supply container defining a second air space over the mix therein and maintained above atmospheric pressure, ice mix feed means including a tube extending between said supply container and said receiving chamber, a source of compressed air, a tubular channel connecting said source to said receiving chamber and said freezing kettle for supplying air under pressure thereto and thence through said tube to said second air space, said tube extending into the upper end of said storage container above the level of the ice mix, the lower end of said tube being immersed below the level of the ice mix in said freezing kettle, said tube having an upper open end communicating with said second air space, a lateral aperture proximate the bottom of said supply container and a lower open end in communication with the receiving chamber to supply liquid mix thereto.

References Cited

UNITED STATES PATENTS

| | | | |
|---|---|---|---|
| 2,132,364 | 10/1938 | Thompson | 62—69 |
| 2,713,253 | 7/1955 | Chandler | 62—306 X |
| 2,947,155 | 8/1960 | Phelan | 62—342 |
| 3,196,633 | 7/1965 | Rapazzini et al. | 62—342 |

ROBERT A. O'LEARY, *Primary Examiner.*

W. E. WAYNER, *Assistant Examiner.*